No. 713,594. Patented Nov. 18, 1902.
W. H. BREWSTER.
BACK PEDALING BRAKE.
(Application filed Sept. 24, 1898.)
(No Model.) 3 Sheets—Sheet 1.
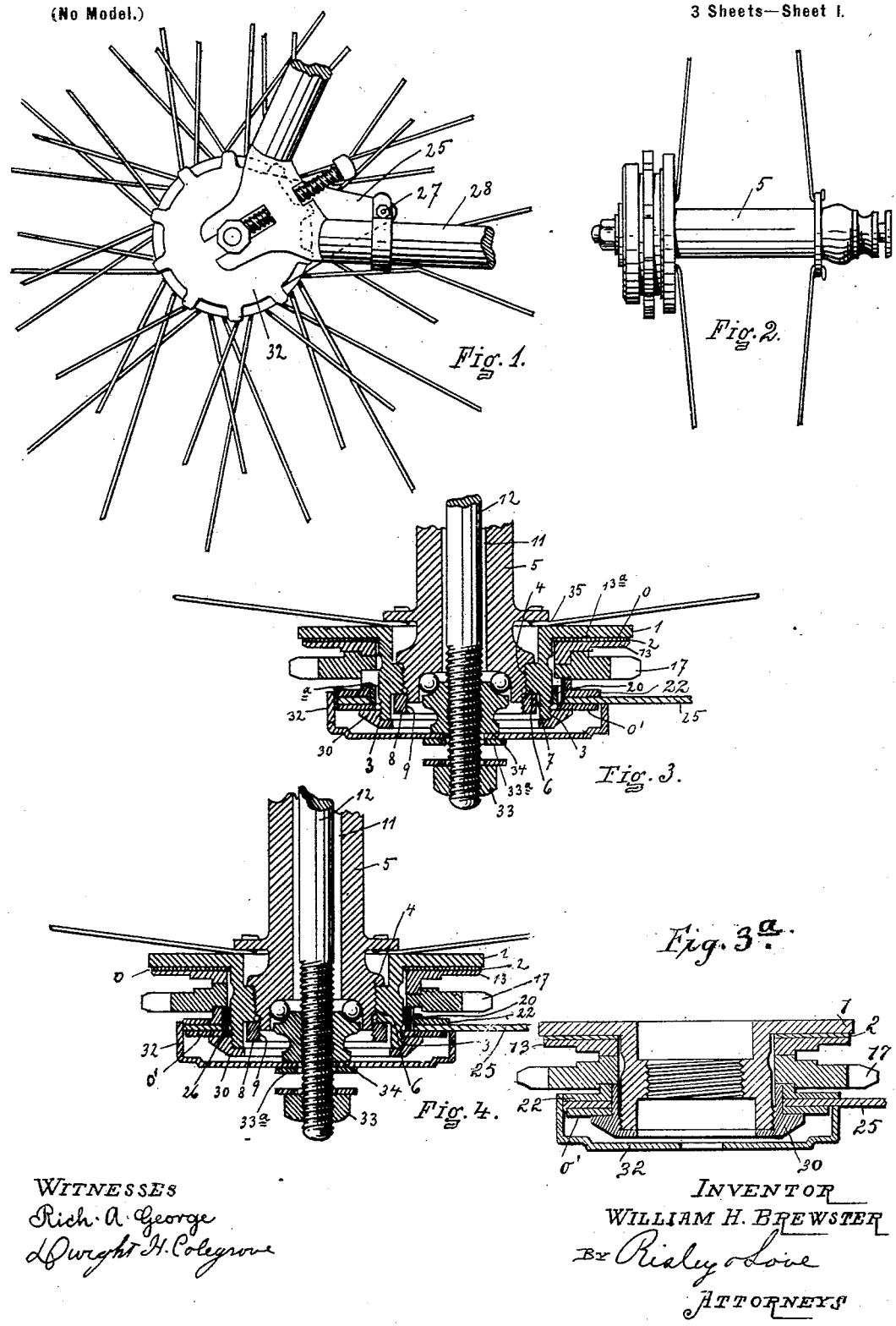
WITNESSES
Rich. A. George
Dwight H. Colegrove
INVENTOR
WILLIAM H. BREWSTER
By Risley & Love
ATTORNEYS No. 713,594. Patented Nov. 18, 1902.
W. H. BREWSTER.
BACK PEDALING BRAKE.
(Application filed Sept. 24, 1898.)
(No Model.) 3 Sheets—Sheet 2.
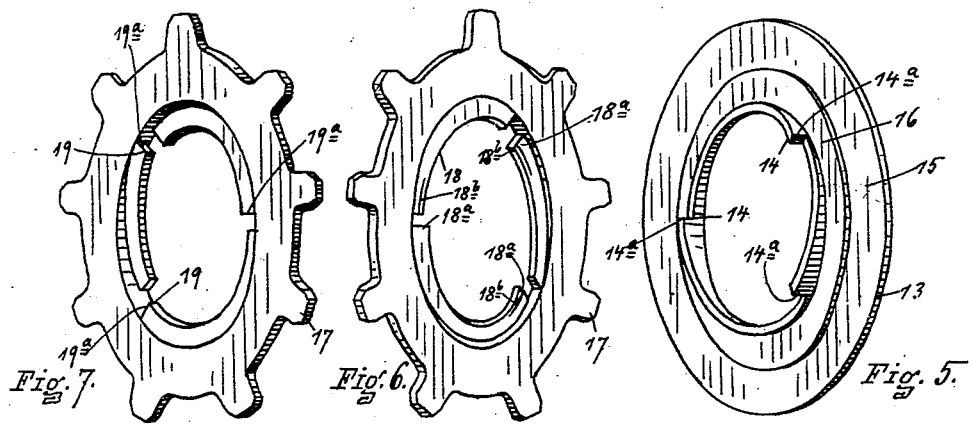
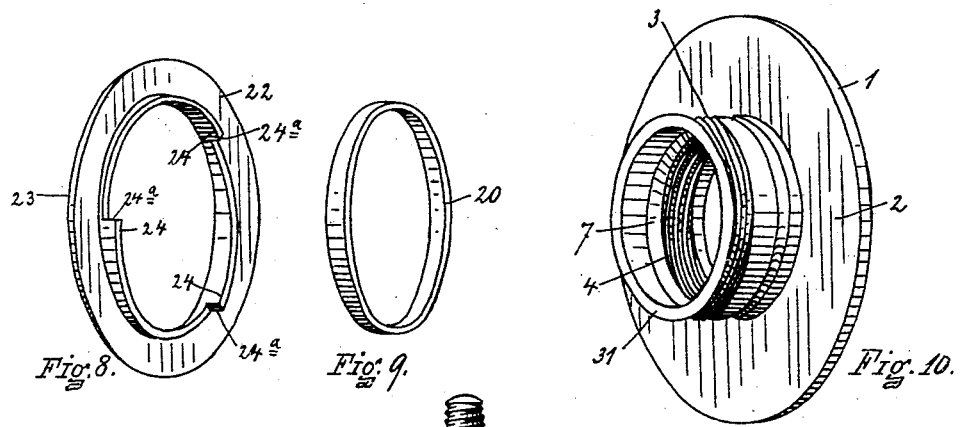
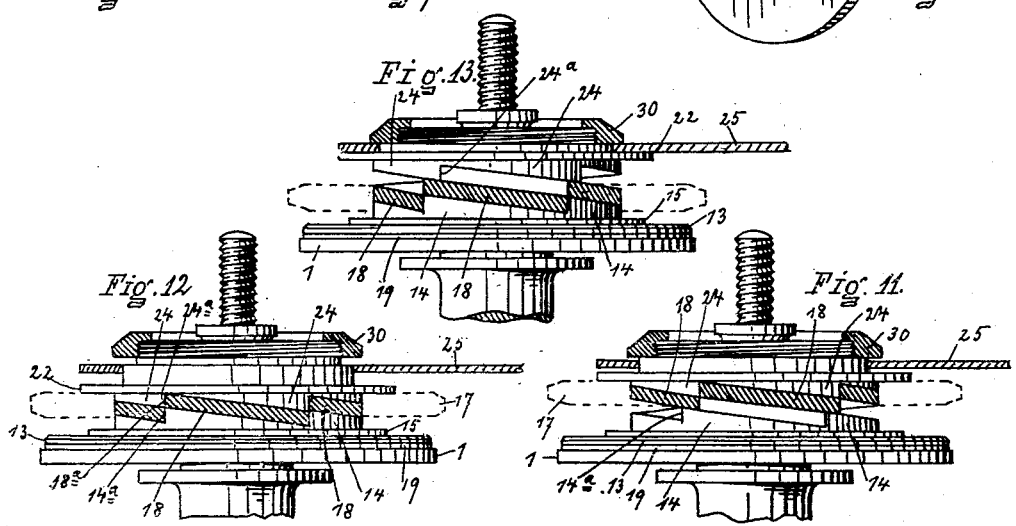
WITNESSES
Rich. A. George
Dwight H. Colegrove
INVENTOR
WILLIAM H. BREWSTER
By Risley Love
ATTORNEYS.

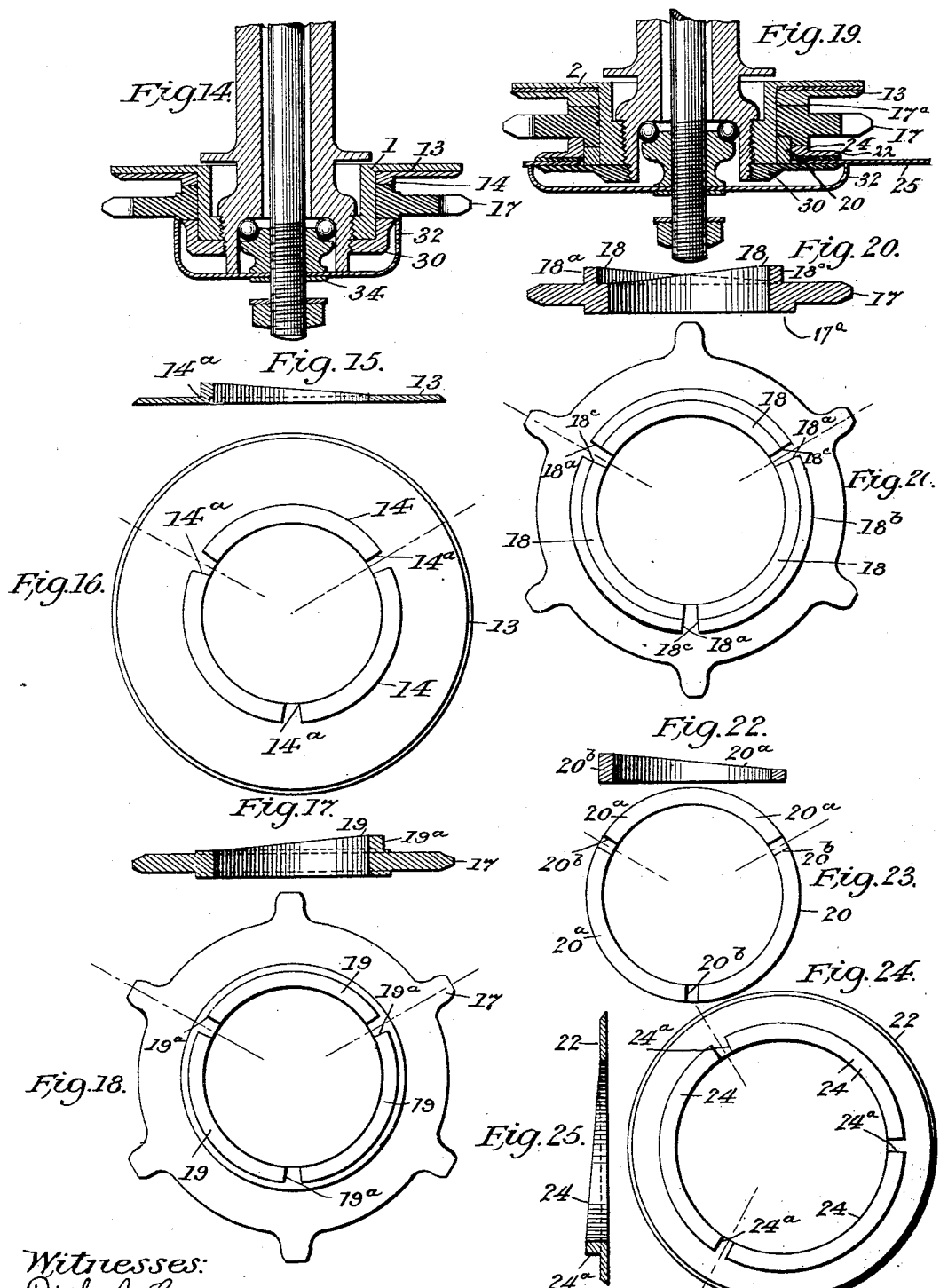

UNITED STATES PATENT OFFICE.

WILLIAM H. BREWSTER, OF UTICA, NEW YORK.

BACK-PEDALING BRAKE.

SPECIFICATION forming part of Letters Patent No. 713,594, dated November 18, 1902.

Application filed September 24, 1898. Serial No. 691,783. (No model.)

*To all whom it may concern:*

Be it known that I, WILLIAM H. BREWSTER, a citizen of the United States of America, and a resident of Utica, Oneida county, New York, have invented certain new and useful Improvements in Back-Pedaling Brakes, of which the following is a specification.

My invention relates to an improvement in bicycles or other wheeled vehicles; and it consists in the combination of mechanism by means of which the driving-wheel can be locked and unlocked from the hub, so that when propelling power is applied to the bicycle or other vehicle the driving-sprocket or gear-wheel is held stationary on the hub and when the driving power is not applied the wheel is allowed to travel, leaving the sprocket or gear loose on the hub, and by reversing the application of the power the momentum of the wheel or vehicle is controlled or stopped by producing friction engagement of the parts.

My invention further consists in the novel combination and arrangement of parts by which the general purposes here expressed are accomplished.

In the drawings, Figure 1 represents a side view of a bicycle wheel and frame, portions being broken and removed. Fig. 2 is a view taken from the right of Fig. 1, the frame portions being removed. Fig. 3 is a longitudinal sectional view of Fig. 1, the frame being removed, showing the position of the parts when the bicycle or vehicle is used for coasting or braking. Fig. 3ᵃ is a sectional view corresponding to Fig. 3, showing the outer abutment or nut integral with the ring which engages the sprocket-wheel or driving member. Fig. 4 is the same view as Fig. 3, showing the position of the parts when the bicycle or vehicle is being driven forward by the power. Fig. 5 is a side or persective view of the inside disk provided with an annular opening and cams surrounding the opening. Fig. 6 is a side or partially perspective view of a sprocket having a central opening for the hub with cams projecting into the opening. Fig. 7 is a side or partially perspective view of the reverse side of Fig. 6. Fig. 8 is a side or perspective view of the outside disk provided with an annular opening, cams surrounding the opening. Fig. 9 is a partially-perspective view of friction-ring. Fig. 10 is a partial view of the hub-shoulder. Fig. 11 is a view of my invention looking down on the same, the dust-cap being removed and a portion of the sprocket being shown in dotted lines and a portion removed, leaving the cams to be shown in section-lines, the nut also being shown in section. Fig. 12 is the same view as Fig. 11, differing only in the location of the parts, which are shown in the position which they assume when the bicycle or vehicle is running forward without the application of power. Fig. 13 is the same view as Fig. 11, differing only in the relative location of the parts which they assume when the bicycle or vehicle is being operated on by friction to either control the speed or to bring the same to a stop. Fig. 14 is a transverse cross-section showing certain parts of a bicycle, by means of which arrangement it is possible to either propel the bicycle in a forward direction or permit it to coast. Fig. 15 is a cross-section on dotted lines of Fig. 16. Fig. 16 is a plan view of the inside disk. Fig. 17 is a section view on dotted lines in Fig. 18. Fig. 18 is a plan view of the sprocket. Fig. 19 is a transverse cross-section of certain parts of a bicycle, by means of which arrangement parts the bicycle can be either propelled in a forward direction, permitted to coast, or be controlled in its speed or brought to a stop. Fig. 20 is a section of a sprocket on dotted lines of Fig. 21. Fig. 21 is a plan view of the sprocket. Fig. 22 is a section of the ring, taken on dotted lines in Fig. 23. Fig. 23 is a plan view of the ring. Fig. 24 is a plan view of the outside disk. Fig. 25 is a cross-section of Fig. 24. Figs. 14, 15, 16, 17, and 18 represent the parts employed for driving the bicycle or for loosening the power and allowing the bicycle to coast, while Figs. 19 to 25, inclusive, represent modified constructions which can be operated to drive the bicycle by the propelling power through the medium of the sprocket, and by loosening the power the wheel is free to coast, the power remaining neutral, and by back-pedaling the speed of the wheel can be regulated or stopped at the will of the operator.

Similar characters refer to corresponding parts in the several views.

I will now proceed to describe the mechanical details of the mechanism employed by me in the best form in which I have up to date practiced my invention. In doing so, however, I do not intend to limit myself to the precise form and shape of the mechanism illustrated in the several figures of the drawings, because it should be borne in mind that the principles of mechanism embodied in my invention admit of changes without departing from the spirit of my invention.

The invention as practiced by me can be readily applied to any bicycle where the sprocket is not made integral with the hub.

The hub 5, Figs. 2, 3, and 4, is a well-known construction and is provided with the usual flanges for connecting the hub and the rim of the wheel, which it is not necessary to describe, as they are of common form. The frame portions or sections shown in Fig. 1 are of common well-known form and need no further description. In the drawings I show the hub-shoulder, as illustrated in Fig. 10, in a separate piece. This hub-shoulder is applied to the periphery of the hub and occupies substantially the same position that the sprocket does on the ordinary bicycle. The hub-shoulder has a broad face 2 and a projecting collar 3, extending from the face of the disk outwardly, the collar forming an opening through which the hub is inserted, the collar being provided on the inside with screw-threads 4, which engage corresponding screw-threads on the hub, and when applied to the hub is screwed thereon firmly and is so held that the same rotates with the hub, as best illustrated in Figs. 3 and 4. The end of hub 5, Figs. 3 and 4, is provided at its outer end with screw-threads 6, which hold the hub-shoulder in position on the hub. For preventing the hub-shoulder from working loose on the hub I provide lock-shoulder 7 on the inside of the collar, as illustrated in Figs. 3, 4, and 10, which receives lock-nut 8, (best illustrated in Figs. 3 and 4,) the parts being screw-threaded to form a "lock-nut," so called. The screw-thread on the inside of the lock-nut is illustrated at 9 in Figs. 3 and 4 and is of ordinary and well-known construction.

It should be borne in mind that the hub-shoulder and lock-nut can be formed separately and brazed as a part of the hub, although in manufacture this would not probably be done, and it is equally obvious that the hub-shoulder can be made integral with the hub and the lock-nut dispensed with. In the event of the hub-shoulder being formed integral with the hub it may be used as a spoke-flange.

Hub 5 is provided with a longitudinal opening 11. (Illustrated in Figs. 3 and 4.) Through this longitudinal opening the axle 12 is inserted. The description thus far relates to the best mode of construction which I have adopted and used in practicing my invention.

On collar 3 of hub-shoulder 1 I place inside disk 13, Fig. 5, the back of disk 13 being flat and made to register with flange 2 of Fig. 10. The two surfaces under certain conditions act as friction-surfaces and under certain other conditions are free to run loose out of friction engagement. The inside disk has an annular flange surrounded by three projecting cams 14 14 14, Fig. 5, also partially shown in Figs. 3 and 4. The cam-surfaces are inclined or wedge-shaped faces with shoulders 14$^a$ 14$^a$ 14$^a$. On the face of the inner disk 13 I have provided rabbeted face 15, producing-shoulder 16, in order to give more lateral clearance to the driving-chain. This feature, however, may be omitted and the parts so constructed as to obviate the necessity of making this rabbeted surface. I also provide sprocket 17. (Illustrated in Figs. 6 and 7 and shown in part in several of the other figures.) In the center of the sprocket is an annular opening which permits it to run loose on the hub, which in this instance is collar 3 of Fig. 10. In the annular opening I provide three cams, each cam having two separate cam-faces on oppositely-disposed sides. In this instance the cams are shown separated. This, however, is only for convenience in manufacture. The oppositely-disposed cam-faces are illustrated in Figs. 6 and 7 and are numbered, respectively, 18 18 18, 19 19 19. I provide cam-shoulders in each set of cams 18$^a$ 18$^a$ 18$^a$, 19$^a$ 19$^a$ 19$^a$. These cams are practically the same width throughout their length, but are placed so that they form inclines with reference to the plane of the face of the disk. In Fig. 6 at 18$^b$ I have rabbeted slightly the ends of these cams to receive the ring 20, Fig. 9. The ring on one of its faces fits into the rabbeted surfaces on the cam in the sprocket, the rabbeted surface being provided in order to give more wearing-surface. The ring 20 is placed over collar 3 of Fig. 10 and is shown in cross-section in Figs. 3 and 4 and is interposed between the rabbeted cams on the sprocket and the jam-nut.

The sprocket illustrated in Fig. 7 is placed on the hub, but in this instance on collar 3 of hub-shoulder 1, (illustrated in Fig. 10,) and the ring 20 (illustrated in Fig. 9) is placed on the hub, which in this instance is on the collar 3 of hub-shoulder 1 of Fig. 10. The ring rests in the rabbeted shoulders 18$^b$ 18$^b$ 18$^b$ on the cams of the sprocket, as shown in Fig. 6. I then provide outside disk 22, (illustrated in Fig. 8,) which has a flat face 23 on the reverse side. This outside disk has an annular opening similar to that shown in Fig. 5, it, however, being sufficiently large in size to allow ring 20 to fit and pass inside of the opening. Surrounding the annular opening in disk 22, Fig. 8, I provide three inclined face-cams (in this instance indicated by 24 24 24) with shoulders 24$^a$ 24$^a$ 24$^a$. The cams taper wedge shape from the lowest to the highest point and are provided to register with the cams on the front face of Fig. 6. The cams on inside disk, Fig. 5, are made to register with the cam-faces on the sprocket, as illustrated in Fig. 7. The face 23 of outside disk runs in or out of contact with stationary plate 25. (Illustrated in section-lines in Figs. 11, 12, and 13 and also partially shown in Fig. 1 and shown in section-lines in Figs. 3 and 4.) This stationary plate is provided with an annular opening, which in this instance is sufficiently large to fit on collar 3 of hub-shoulder 1, Fig. 10, and to admit between them ring 20, Fig. 9, and is held from rotation by its end being connected at 27, Fig. 1, to the arm of frame 28; but it is obvious that this may be held in any other manner from rotating with the hub. I then place screw-threaded collar or nut 30, best illustrated in Figs. 11, 12, and 13, also shown in cross-section in Figs. 3 and 4. This nut screws onto the outer end of collar 3 of hub-shoulder 1. (Illustrated in Fig. 10.) I do not, however, confine myself to simply screwing this on. It may be held in position by any mechanism suited to that end. Nor do I confine myself in any way to the mode of applying the same. It is sufficient if it holds the parts properly together. For convenience and to compensate for wear of the parts I have provided and used inside washer $o$ and outside washer $o'$, sufficiently illustrated in Fig. 3. These washers may be made of metal or fibrous substance or may be omitted; but I have found it desirable to use fibrous material to take the wear which would otherwise be on the friction-surfaces of the outside and inside disks. I next provide dust-cap 32. (Illustrated in Figs. 3 and 4 and seen in side view in Fig. 1.) This dust-cap is provided with an annular opening to admit through it the axle or bearing of the wheel and is arranged to fit over the parts nicely and is held in place, being clamped between cone 34 and washer $33^a$. In the drawings I have not illustrated the mode of applying power to the sprocket. It may, however, be applied by the ordinary bicycle-chain, or it might be a belt or cable or any other means of transmitting power to what I term the "sprocket" in this instance.

I do not limit myself to the employment of a sprocket-wheel rotary driving member, as other forms of rotary driving means can be employed.

Having described the construction of the mechanism employed in my invention, I will now proceed to describe its operation. When the sprocket is driven forward by the ordinary power applied, cams 19 19 19 (shown in Fig. 7) are in contact with cams 14 14 14 on inside disk 13. Ring 20 abuts upon the reverse side of cams 19 19 19, resting against the rabbeted surfaces $18^b$ $18^b$ $18^b$, and the opposite edge of the ring abuts against nut 30. (I should, however, here mention that this ring and the nut may be formed in one piece (see Fig. $3^a$) or connected by any proper means for uniting the two, and in this instance flanged nut 30 would run in contact with the rabbeted grooves $18^b$ $18^b$ $18^b$.) However, I do not wish to limit my invention to the means shown for limiting the end thrust of the rotary driving member, as other devices and arrangements can be employed for this purpose where desirable or necessary.

By the operation of the parts the sprocket is locked with the hub and rotates with it, and through locking of the parts the bicycle is driven forward by moving the pedals or other connecting power. If the operator desires to disconnect the power and allow the bicycle to coast, he stops the pedals, and thereby the sprocket in its movement is stopped, and the forward movement of the wheel rotates the inner disk 13, which moves cams 14 14 14 out of engagement and brings shoulders $14^a$ $14^a$ $14^a$ into engagement with shoulders $19^a$ $19^a$ $19^a$ of the sprocket, which leaves the bicycle free to go forward by its own momentum without operating the pedals or power.

For controlling the bicycle and applying friction to control its speed or to bring the same to a halt the operator reverses the movement of the pedals or power, which moves the sprocket backward, the stationary plate 25 being held from rotating. Outside disk 22, Fig. 8, on its plane face 23, through the operation of the two faces being brought into frictional contact, is stopped in its rotating, and cams 24 24 24 are moved into engagement with the cams 18 18 18 on the sprocket, and by the operation of the double-face cams on the sprocket it is controlled or held between the outer and inner disks. By this operation sufficient friction to retard or bring the bicycle to a complete stop can be applied. The cam-shoulders $24^a$ $24^a$ $24^a$ on outside disk 22, Fig. 8, are in engagement with cam-shoulders $18^a$ $18^a$ $18^a$, Fig. 6. The parts are then in position for driving the bicycle forward by the application of power on the sprocket. When the pedals are stopped, the momentum of the outside disk carries it forward sufficient to unlock the engaging shoulders. In this position the bicycle will be coasting. By back-pedaling the cam-faces on the outer disk and on the sprocket are brought into frictional engagement, and the back pressure on the pedals will determine the speed of the bicycle or bring it to a comeplete stop, depending on the power applied.

When shoulders $24^a$ $24^a$ $24^a$ and shoulders $18^a$ $18^a$ $18^a$ are separated, the braking power is applied for controlling or stopping the forward movement of the bicycle. By this arrangement of parts no extra pressure is brought upon the ball-bearings or upon the journal upon which the hub runs, and this invention may be applied to any bicycle where the sprocket is made in the hub. The location and arrangement of the outside disks may be reversed.

In the drawings, Figs. 14 to 18, inclusive, illustrate mechanism by the use of which the bicycle can be driven forward or used for coasting purposes without the working power.

In the construction illustrated in Figs. 14, 15, 16, 17, and 18 the hub or rotary driven member is provided with the annular flange or shoulder 1, rigid therewith and having the friction-clutch face. 17 is the rotary driving member, loosely mounted on the driven member and limited in end thrust by the nut or collar 30, screwed onto the hub or driven member and having a flange extending inwardly and engaging the outer end of the driving member. A friction-clutch mechanism is provided between the driving member and the driven member, arranged to lock the driving member to the driven member when the driving member is rotated forwardly and to release the driving member from the driven member and permit independent forward rotation of the driven member when the driving member is moved backward or its forward rotation is suddenly or forcibly retarded or stopped. Various mechanisms can be provided for this purpose. For instance, in said figures of the drawings I show the clutch mechanism comprising said friction-clutch face of the driven member and a corresponding friction-clutch face moving with the driving member. In this instance the driving-member clutch-face is carried by the plate or disk 14 loose on the driven member and movable laterally between flange 1 and the sprocket (driving member) 17 and having the end-thrust-producing shouldered wedge cam-faces 14 14$^a$, before described, coöperating with the corresponding oppositely-inclined end-thrust-producing shouldered cam-faces 19 19$^a$ of the sprocket, as hereinbefore described. When the driving member rotates forwardly, the nut 30 forms the abutment therefor or resists the end thrust thereof, and the opposite wedge-faces 19 14 lock the clutch-faces together, and consequently lock the driving member to the driven member. When during the forward rotation of the parts the driving member is stopped or retarded, the cam-faces 14 19 travel back on each other and relieve the end thrust or lateral or expanding pressure, which locks the clutch-faces together, and thus releases the driving member and its clutch-face 13 from the driven member, permitting the independent forward rotation of the driven member.

In Figs. 19 to 25, inclusive, I illustrate the best system of mechanism for performing the three functions—first, to drive the bicycle; second, to disconnect the power and leave the pedals stationary while the bicycle goes forward, and, third, by back-pedaling the speed of the bicycle can be controlled or brought to a stop at the will of the operator. In this instance the inside face 17$^a$, Fig. 19, of the sprocket (shown in two parts, but which can be made in one piece) 17, Figs. 19, 20, and 21, is mounted loosely on the hub to run in close contact with the shouldered flange 2, Fig. 10, which prevents the sprocket from inward thrust on the hub. The incline face-cams are placed on the outer vertical surface of the sprocket, the incline in each series of cams being in opposite direction. The duplicate cam-faces 18 18 18 and 18$^b$ 18$^b$ 18$^b$, Fig. 21, project from the vertical face of the sprocket. This sprocket is mounted loosely on the hub. I next place on the hub ring 20, Fig. 23. The inner face or edge of the ring is provided with incline cams 20$^a$, which register with the cam on the sprocket 18 18 18, Fig. 21. These incline cams have shoulders 20$^b$, Fig. 22, which engage shoulders 18$^a$ 18$^a$ 18$^a$ on sprocket 17, the ring fitting loosely over the hub. Over this ring is fitted outside disk 22, Fig. 24, which is provided on its vertical face with incline cams 24, Fig. 25, provided with shoulders 24$^a$, Fig. 25, which register with the incline cams 18$^b$ 18$^b$ 18$^b$, Fig. 21, and form the outer circle of cams on the sprocket, Fig. 21. The shoulders 24$^a$, Figs. 24 and 25, engage shoulders 18$^c$ 18$^c$ 18$^c$. These shoulders come practically in contact or close to contact under the varying conditions of the parts; but when the parts are reversed the incline faces of the cam travel upon each other, and thus produce the requisite friction to perform the functions heretofore explained. In this construction the ring has to run loose on the hub when the frictional surfaces just described engage each other. The sprocket is held from inward thrust by the mechanism heretofore described, and the outward thrust of the disk, running in contact with the stationary plate 25, Fig. 19, is held from outward thrust by jam-nut 30, or it may be held in any other manner.

It is obvious that the sprocket and disk may be reversed in their location, so that the vertical face of the sprocket, carrying the duplicate cams, may be turned inward and made to register with cams on suitable disk.

I do not wish to limit my invention to having the friction-clutch face or surface which rotates with the driving member and opposes the corresponding clutch-face of the driven member loose or separate with respect to the driving member, for, as illustrated in Figs. 19 to 25, inclusive, the cam-faces which cause the lateral clutch-applying thrust or pressure can be carried by other elements than the disk or plate 13 and can be located on the opposite side of the driving member from the plate 13. Also I do not wish to restrict myself to the exact location and arrangement of the cam-faces or other end-thrust-producing devices, nor to the exact arrangement and location of the clutch and brake faces, nor to the construction of Figs. 3 and 4, where both of said friction-faces controlled by the driving member are formed by plates or disks separate from said member. In the specific construction illustrated in said last-mentioned figures of the drawings it might be noted that when the driving member is driven forward the clutch-applying end or lateral thrust is received by the cam-faces of the ring 20, and the cam-faces which act on the braking-face are inactive or dormant. When the driving member is retarded and stopped, all of the cam-faces assume their dormant or inactive positions, and there is practically no end thrust or pressure on the brake and clutch members or faces, and consequently the driven member is free to rotate forwardly independently of said driving, brake, and clutch mechanism loosely located on the driven member. If, however, the driving member is turned backwardly, the cam devices, acting on the braking-face, are immediately brought into action and the clutch, brake, and driving mechanism is expanded to force both the brake and clutch faces against their respective opposing faces secured to the frame and driven member, respectively. While this braking action is taking place, the ring 20 in the construction of said figures does not form the abutment, as it does when the clutch only is acting; but, in effect, the cam-faces of the disk 22 constitute the abutment to cause the lateral expansion in both directions of the driving, brake, and clutch mechanism (comprising the disks 13 and 22 and the sprocket) between and against clutch-face 2 of the hub and brake-face 25 of the frame. When the driving member is rotating forwardly with the driven member, said driving, brake, and clutch mechanism is expanded in one direction only—viz., the clutch-face thereof is driven against the clutch-face of the driven member, and the ring 20 forms the abutment, and there is no expanding or lateral pressure or end thrust against the brake-face of said mechanism.

The abutment or device to receive the end thrust when the clutch is applied can be arranged in various ways and of various constructions other than those shown in the examples illustrated. Also various arrangements of cam devices can be employed under the control of a loose driving member to release or cause the lateral expansions or end thrusts, which apply a clutch-face or both the clutch and brake faces.

In the braking or the clutching operations of the devices described no strain is exerted on the hub-bearings, for the reason that the strain, thrust, or pressure created in both the clutching and braking actions is in opposite directions against two surfaces or faces, both fixed to the hub, and is thus equalized, so far as the hub-bearings are concerned. For instance, in the construction shown in Figs. 3 and 4 when the driving member is locked to the hub and is driving the same forwardly the thrust in one direction is against the shoulder 1, rigid with the hub, and the thrust in the opposite direction is against the shoulder 30, also rigid with the hub. During the braking operation when the hub is rotating forwardly independently of the driving member the thrust in opposite directions is against the same parts rigid with the hub—viz., shoulder 30, formed by the nut or ring screwed on the hub and shoulder 1. During this braking operation the thrust or pressure in one direction is against the non-rotary plate or member 25; but said shoulder 30 forms an abutment for said plate 25 either through the medium of or without the interposed disk or washer abutting against the said plate and shoulder and located between them. In fact, it might be said that the operative parts of the device, or parts mounted independently or loosely with respect to the hub, are located between two shoulders, abutments, or friction-surfaces rigid with the hub, which are opposed by two surfaces included within said before-mentioned operative parts.

My invention broadly comprises a coaster-brake embodying a non-rotary brake member and devices controlled by the forward rotation of the driving member, loosely mounted with respect to the driven member to cause the driving of the driven member by the driving member, and wherein the retarding of the forward rotation of the driving member permits the independent forward rotation of the driven member and wherein the backward or reverse movement of the driving member causes such coöperation between said brake member and a surface moving with the driven member as to retard or brake the forward rotation of the driven member.

Although I do not wish to limit the broad feature of my invention to shouldered cams, yet the term "shouldered" is employed in certain claims in its broadest sense whatever the construction of devices may be which are employed to exert the thrust in applying the brake or in locking the driving member to the driven member. Said term is employed in a broad sense to imply—for instance, where a cam or inclined surface is employed—that means are provided to hold or confine the opposing member or element in proper relative position when the thrust, whether lateral or otherwise, is relieved, whereby when the driving member is moved in one direction a certain cam device will exert thrust; but when said member is moved in the opposite direction said cam device will not exert thrust, but will maintain its opposing element in the proper relative position for the application of thrust on the reverse movement of the driving member.

From the description already given it is apparent that the incline faces of the cams with the friction on the parts will bring themselves into engagement automatically when power is applied by driving the bicycle forward, that when the power is stopped and the pedals brought to a rest the momentum of the bicycle will free the parts and allow the bicycle to coast, and by back-pedaling the speed can be controlled when the bicycle is brought to a stop, depending upon the will of the operator. All these interlocking movements are automatic. For accomplishing the three purposes heretofore enumerated the essential elements to perform these operations consist of the loosely-mounted sprocket, having incline cams on one or both of its faces, in combination with the other mechanism already pointed out and shown.

What I claim as new, and desire to secure by Letters Patent, is—

1. In combination, in a back-pedaling brake, a shouldered hub, an inner loosely-mounted disk having wedge-shaped shouldered cams on its vertical face, a loosely-mounted sprocket having wedge-shaped shouldered cams on its vertical face registering with said shouldered cams of the disk, adjustable means holding the sprocket against outward thrust, a non-rotary member, a rotary brake-face opposing the same, and mechanism actuated by the reverse movement of said sprocket to brake the independent forward rotation of said hub, substantially as described.

2. The combination of a hub, a collar secured thereon and provided with a flange, a disk loosely mounted on the collar and opposing said flange and provided with cam-faces on its vertical face, a rotary driving member loose on the collar and provided with cam-faces on its vertical face corresponding to and registering with said cam-faces of the disk, and a jam-nut limiting the end thrust of said driving member, substantially as described.

3. In combination, a hub having a threaded portion, an internally-threaded collar on said threaded portion of the hub, a nut screwed on the hub to lock said collar, said collar having a flange at its inner portion and externally threaded at its outer portion, a rotary driving member loose on the collar, a nut on said external threaded portion of the collar limiting the end thrust of the driving member, a friction-clutch mechanism for locking said driving member and flange to rotate forwardly together and to release the same by backward movement of the driving member and permit independent forward rotation of the hub, substantially as described.

4. In combination, in a back-pedaling brake, a rotary driven member having a friction-clutch surface and an abutment rotating therewith, a rotary driving member loosely mounted with respect to said driven member, means receiving the end thrust of said driving member, a friction-clutch surface opposing said surface of the driven member and adapted to move into and out of locking engagement therewith, a brake mechanism between the driving member and the driven member and including a non-rotary member and said abutment and actuated by the reverse movement of the driving member, said driving member having an inclined or wedge cam-face with a shouldered end, and a member having a corresponding registering cam-face with a shouldered end, substantially as described.

5. In a device of the character described, the combination of a rotary driven member having a clutch-surface, a rotary driving member for and loosely mounted with respect to said driven member to permit the independent forward rotation thereof, means to receive the end thrust of said driving member, a clutch-surface opposing said driven-member clutch-surface and loosely mounted with respect thereto, mechanism controlled by the movement of said driving member and controlling the end thrust on said opposing clutch-surface to lock the driving member to and release it from said driven member, and a brake mechanism between the driven and driving member and applied by the reverse movement of the driving member and comprising a non-rotary member, substantially as described.

6. In combination, a rotary driven member, a rotary driving member for and loosely mounted with respect to the driven member to permit independent forward rotation thereof, a clutch mechanism adapted to lock the driving member to the driven member on the forward rotation of the driving member, and comprising a cam device exerting thrust to lock said driving and driven members together, and controlled by the forward movement of said driving member to exert said thrust and by the stopping of said driving member to release said thrust and permit the independent forward rotation of said driven member, a non-rotary element, and an element coöperating therewith and rotating with the driving member, and means receiving the end thrust of the driving member, substantially as described.

7. In combination, a rotary driven member having a clutch-surface rigid therewith, a rotary driving member for and loosely mounted on the driven member to permit the independent forward rotation thereof, a rotary clutch-surface independently mounted with respect to the driving member and arranged beside said clutch-surface of the driven member, means receiving the end thrust of the driving member, a brake mechanism comprising a non-rotary member and a coöperating braking-face, said brake controlled by the reverse movement of the driving member, and cam devices arranged on a vertical face of said driving member and controlled by the movement thereof to exert end pressure to hold said clutch-surfaces together, locking the driving member to the driven member on the forward rotation of the driving member, and to release said end pressure and permit the independent forward rotation of the driven member when the forward rotation of the driving member is stopped or retarded, substantially as described.

8. In combination, a hub having a shoulder rigid therewith, a clutch-surface loosely mounted on the hub beside and movable laterally to and from said shoulder, a rotary driving member for and loosely mounted on the hub to permit the independent forward rotation thereof, said clutch-surface located between said member and said shoulder, means resisting end thrust of said member, a brake mechanism on said hub and comprising a non-rotary member, a coöperating rotary member and controlling devices thrown into operation by the reverse movement of the driving member, and shouldered wedging cam devices creating and relieving end thrust on said clutch-surface to apply and release the same from said shoulder and controlled and actuated by the forward rotation and stopping of said driving member, substantially as described.

9. In combination, a hub having a clutch-shoulder, a rotary driving member loosely mounted on the hub to permit the independent forward rotation thereof, means on the hub receiving the end thrust of said member in one direction, a braking mechanism comprising a non-rotary member and a coöperating element, and controlling devices actuated by the reverse movement to relieve said means of end thrust and apply the brake under end thrust, a loosely-mounted clutch-disk on the hub between the shoulder and member and movable under end thrust to and from said shoulder, and clutch-disk setting and releasing wedging cam devices controlled by the forward rotation and stopping of said member and comprising shouldered cams on a vertical face of said member and coöperating elements acting therewith to produce and relieve the end thrust to lock the driving member to and release it from said hub, substantially as described.

10. In a coaster and back-pedaling brake, the combination of a frame, a hub having a friction-clutch face, a non-rotatable plate secured to the frame and having an opening loosely receiving the hub, a rotary driving member loosely mounted with respect to the hub to permit the independent forward rotation thereof, a brake-surface loosely mounted with respect to the hub and beside a movable under end thrust to said plate, a clutch-surface loosely mounted with respect to the hub and beside and movable under end thrust to said friction-clutch face, means receiving the end thrust of said member, and end-thrust-exerting shouldered cam devices controlled by the forward and backward movement and stopping of said member and exerting and releasing end thrust on said surfaces, substantially as described.

11. In combination, a hub having a flange forming a friction-clutch face, a rotary driving member loosely mounted with respect to the hub, means receiving the end thrust in one direction of said member, brake mechanism comprising coöperating brake members, one of which is fixed, and controlling devices actuated by the reverse movement of the driving member to exert brake-applying thrust on said brake members, a friction-clutch surface beside said flange and movable under end thrust to said flange to lock the driving member to the flange, and an end-thrust-exerting cam device controlling said surface and controlled by the forward rotation of said member to apply said end thrust to lock the member to the hub and by the stopping of said member to release said end thrust and permit independent forward rotation of the hub, substantially as described.

12. In combination, a frame, a non-rotary brake-surface carried thereby, a rotary driven member having a clutch-surface, a rotary driving-brake and clutch mechanism loosely mounted with respect to the driven member to permit the independent forward rotation thereof and arranged between said non-rotary brake-surface and said clutch-surface of the driven member, and comprising a rotary driving member, clutch and brake surfaces loosely mounted and independently laterally movable under end thrust with respect to each other, and shouldered end-thrust-producing devices controlled by the forward and backward movements and stopping of said driving member and controlling the end thrust of said clutch and brake surfaces, and end-thrust-receiving means, substantially as described.

13. In a device of the character described, the combination of a frame, a non-rotary brake-surface confined thereto, a rotary driven member adjacent to said surface and provided with a clutch-face, a rotary driving brake and clutch mechanism loosely mounted with respect to said driven member to drive, brake and permit the independent forward rotation thereof and comprising a rotary driving member, end-thrust-receiving means, a coöperating laterally-movable brake-surface, a laterally-movable clutch-surface coöperating with said clutch-face of the driven member, said surfaces of said mechanism being loosely mounted with respect to each other, and to actuating devices controlled by the forward and reverse rotation and the stopping of said driving member, and controlling the application and release of end thrust on said clutch and brake surfaces, substantially as described.

14. In combination, a frame, a brake-surface secured thereto, a rotary driven member adjacent to said surface, a rotary driving member loosely mounted with respect to the driven member, a clutch mechanism between the driving and driven member provided with actuating mechanism controlled by the forward rotation and stopping of said driving member to lock the driving member to and release it from the driven member, end-thrust-receiving means for said driving member, a laterally-movable brake-surface loosely mounted with respect to the driven member and arranged beside said brake-surface of the frame, and actuating devices controlling the lateral movement of said brake-surface and actuated by the reverse movement of said driving member, substantially as described.

15. In combination, a frame, a brake-surface secured thereto, a rotary driven member having a clutch-surface rigid therewith, a rotary driving member loosely mounted on the driven member, a movable coöperating clutch-surface rotating with the driving member and forced to said driven-member surface by end thrust, end-thrust-producing shouldered cam devices acting on said coöperating clutch-surface and controlled and actuated by the forward rotation of said driving member and thrown out of action by stopping said driving member, a coöperating brake-surface rotating with said driving member and forced to said frame brake-surface by end thrust, means relieving said coöperating brake-surface of end thrust on the forward rotation of said driving member, and end-thrust-producing shouldered cam devices for said coöperating brake-surface controlled and actuated by the backward turning of said driving member and thrown out of action by the forward rotation of said driving member, substantially as described.

16. In combination, a frame, a brake-surface confined thereto, a rotary driven member having a clutch-surface fixed thereto, a rotary driving member for and loosely mounted with respect to the driven member, end-thrust-receiving means for said driving member, said driving member provided with two sets of end-thrust-producing shouldered cams, the cams of one set oppositely inclined to those of the other set, clutch and brake surfaces rotating with said driving member and coöperating with said driven member and frame-surfaces, respectively, the end thrust on said surfaces to apply the clutch or perform the braking action being controlled by said cams on the forward or backward turning of said driving member, substantially as described.

17. In combination, a frame, a rotary driven member having a clutch-surface, a plate fixed to the frame and arranged beside said member, a rotary driving member loose on the driven member between said surface and said plate, means carried by the driven member to limit the end thrust of said driving member, a disk loose on the driven member between said surface thereof and said driving member and adapted to move into and out of locking engagement with said surface, a disk loose on the driven member between said driving member and said plate and adapted to move into and out of braking engagement with said plate, said disks mounted to allow independent end thrust with respect to each other, and end-thrust-producing shouldered cam devices controlling and releasing the end thrust on said disks, respectively, and located beside and controlled by said driving member and actuated by its forward, stopping or reverse movements, substantially as described.

18. In a coaster-brake wherein the driving member when rotated forwardly is locked to the hub, and when retarded is released from the hub permitting the independent forward rotation of the hub and when turned rearwardly applies a brake to retard or stop the independent forward rotation of the hub, the combination of a frame, a driven hub having a clutch-face fixed thereto, a plate secured to the frame and loosely receiving the hub, a rotary driving member loosely mounted on the hub to permit the independent forward rotation of the hub, a stop device carried by the hub to limit the end thrust of the driving member in one direction, said driving member formed with two series of shouldered inclined cam-faces, the cams of one set inclined oppositely to those of the other set, a clutch device coöperating with said clutch-face of the hub to lock the driving member to and release it from said hub and provided with means engaging and actuated by the end thrust of one set of said cams, and a brake device coöperating with said plate to brake the independent forward rotation of said hub and provided with means engaging and actuated by the end thrust of the other set of said cams, substantially as described.

19. In a back-pedaling coaster-brake wherein the driving member when rotated forwardly is locked to the driven member to drive the same, and when retarded permits the independent forward rotation of the driven member, and when turned rearwardly applies a brake to retard or stop the independent forward rotation of the driven member, the combination of a rotary driven member, a rotary driving member loosely mounted with respect to the driven member, a laterally-applied clutch mechanism between the driven member and the driving member controlled and applied by the forward rotation of and released by retarding or stopping the forward rotation of the driving member, and a laterally-applied brake mechanism for said driven member comprising a fixed and a coöperating brake member and actuating means controlled and applied by the rearward turning of said driving member, substantially as described.

20. In a back-pedaling coaster-brake, wherein the forward rotation of the driving member locks the same to the driven member, and retarding or stopping the forward rotation of the driving member permits the independent forward rotation of the driven member, and backward turning of the driving member causes the application of a brake to retard or stop said independent forward rotation of the driven member, the combination of a rotary driven member, having two abutments fixed thereto, a rotary driving member loosely mounted with respect to the driven member, a laterally-applied clutch mechanism between the driving and driven members and controlled by the driving member, and a brake mechanism comprising coöperating brake members, one of which is fixed, and actuating mechanism controlled by said driving member, said members and mechanisms being arranged on said driven member between said abutments, substantially as described.

21. In a back-pedaling coaster-brake, the combination of a rotary driven member having two abutments or friction-faces revolving therewith, a rotary driving member loosely mounted with respect to said driven member, a laterally-applied clutch mechanism controlled by said driving member to lock the driving member to the driven member on the forward rotation of the driving member and to release the driving member and permit the independent forward rotation thereof on retarding or stopping the driving member, and laterally-applied brake mechanism comprising actuating devices controlled by the driving member and applied by the reverse movement thereof to retard or brake the independent forward rotation of the driven member through the medium of said brake member, substantially as described.

22. In a back-pedaling coaster-brake, the combination of a rotary driven member having oppositely-facing rigid friction-surfaces forming abutments to receive thrust in opposite directions, a rotary driving member loosely mounted with respect to the driven member, a laterally-applied clutch mechanism controlled by said driving member to lock the same to the driven member through the medium of and by opposite thrust against said surfaces on the forward rotation of the driving member and to release the same and permit independent forward rotation of the driven member on stopping or retarding the driving member, and a laterally-applied brake mechanism controlled by said driving member to retard or brake the independent forward rotation of said driven member, on the reverse movement of the driving member, through the medium of said brake member and by thrust in opposite directions against said two surfaces, substantially as described.

23. In a back-pedaling coaster-brake wherein strain on the hub-bearings by the forward driving action and by the braking action is avoided, the combination of a rotary hub and its bearings, said hub provided with a friction-clutch surface and with a brake-surface both carried by the hub, a rotary driving member loosely mounted with respect to the hub, a laterally-applied clutch mechanism controlled by the driving member and arranged to lock the same to the hub on the forward rotation of the driving member and to release the same and permit the independent forward rotation of the hub when the driving member is retarded or held stationary, and a laterally-applied brake mechanism comprising a non-rotary brake member and actuating devices controlled by said driving member and arranged to brake or retard the independent forward rotation of the hub when the driving member is turned backwardly, substantially as described.

24. In a back-pedaling coaster-brake, the combination of a hub having a rigid abutment, an adjustable abutment rigid with the hub, a non-rotary brake member loosely receiving the hub and arranged to exert thrust on one of said abutments to brake or retard the independent forward rotation of the hub, a rotary driving member loosely mounted with respect to the hub and provided with shouldered cams, and mechanism controlled thereby to lock the hub to and release it from said driving member on the forward rotation and stopping thereof, reversely-arranged shouldered cams controlled by the driving member and mechanism controlled by said cams to brake the independent forward rotation of the hub when the driving member is turned rearwardly, and means to relieve the non-rotary brake member of braking thrust during the forward rotation and stopping of the driving member, substantially as described.

25. In combination, a hub having a collar fixed thereon and provided with an abutment, an adjustable abutment on said hub, a rotary driving member loosely mounted on said collar between said abutments, a non-rotary brake member between said abutments, mechanism to lock the driving member to the hub on the forward rotation of the driving member and to release the same from the hub on retarding the forward rotation of said driving member, means to relieve the brake member of braking thrust on the forward rotation of the driving member, and mechanism controlled thereby for exerting braking thrust on said brake member to brake the independent forward rotation of the hub when said driving member is turned rearwardly, substantially as described.

Signed by me at Utica, New York.

WILLIAM H. BREWSTER.

Witnesses:
PHEBE A. TANNER,
DWIGHT H. COLEGROVE.